(12) United States Patent
Ogawa et al.

(10) Patent No.: US 11,288,156 B2
(45) Date of Patent: Mar. 29, 2022

(54) CONTROL APPARATUS, CONTROL METHOD, AND COMPUTER PROGRAM

(71) Applicant: SUMITOMO ELECTRIC INDUSTRIES, LTD., Osaka (JP)

(72) Inventors: Akihiro Ogawa, Osaka (JP); Hirofumi Urayama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 148 days.

(21) Appl. No.: 16/628,401

(22) PCT Filed: May 28, 2018

(86) PCT No.: PCT/JP2018/020272
§ 371 (c)(1),
(2) Date: Jan. 3, 2020

(87) PCT Pub. No.: WO2019/035259
PCT Pub. Date: Feb. 21, 2019

(65) Prior Publication Data
US 2020/0133812 A1    Apr. 30, 2020

(30) Foreign Application Priority Data
Aug. 16, 2017  (JP) .............................. JP2017-157191

(51) Int. Cl.
*G06F 11/30*    (2006.01)
*H04W 4/48*    (2018.01)
(Continued)

(52) U.S. Cl.
CPC ........ *G06F 11/3013* (2013.01); *H02J 7/0029* (2013.01); *H02J 7/0047* (2013.01); *H04W 4/48* (2018.02); *H04L 12/4015* (2013.01)

(58) Field of Classification Search
CPC ..... G06F 11/3013; H04W 4/48; H02J 7/0029; H04L 13/4015
See application file for complete search history.

(56) References Cited

U.S. PATENT DOCUMENTS

2005/0285445 A1* 12/2005 Wruck ...................... H02J 1/14
                                                                  307/10.1
2013/0197712 A1   8/2013 Matsuura et al.
(Continued)

FOREIGN PATENT DOCUMENTS

JP    2015-37938 A    2/2015
JP    2015-51695 A    3/2015
(Continued)

*Primary Examiner* — Peter D Nolan
*Assistant Examiner* — Mikko Okechukwu Obioha
(74) *Attorney, Agent, or Firm* — Oliff PLC

(57) ABSTRACT

A control apparatus that communicates with a plurality of on-vehicle control devices through in-vehicle communication lines, and includes an acquisition unit configured to acquire electric energy of a battery supplying electric power to the plurality of on-vehicle control devices, and a control unit configured to instruct, in a case where predicted electric energy of the battery at a time when a process by a target device that is one of the plurality of on-vehicle control devices is completed is lower than a first threshold, other on-vehicle control devices to stop respective processes by the other on-vehicle control devices executed in parallel with the process by the target device.

13 Claims, 9 Drawing Sheets

(51) Int. Cl.
*H02J 7/00* (2006.01)
*H04L 12/40* (2006.01)

(56) References Cited

U.S. PATENT DOCUMENTS

| | | | |
|---|---|---|---|
| 2018/0032324 A1* | 2/2018 | Sarkar | G06F 8/65 |
| 2018/0203683 A1* | 7/2018 | Kim | G06F 1/3212 |
| 2019/0193653 A1* | 6/2019 | Nakamura | G06F 1/24 |
| 2019/0354362 A1* | 11/2019 | Saito | B60Q 9/00 |

FOREIGN PATENT DOCUMENTS

| | | |
|---|---|---|
| JP | 2016-88262 A | 5/2016 |
| WO | 2012/017719 A1 | 2/2012 |

\* cited by examiner

CONTROL APPARATUS, CONTROL METHOD, AND COMPUTER PROGRAM

TECHNICAL FIELD

The present invention relates to a control apparatus, a control method, and a computer program.

This application claims priority on Japanese Patent Application No. 2017-157191 filed on Aug. 16, 2017, the entire contents of which are incorporated herein by reference.

BACKGROUND ART

For example, Patent Literature 1 discloses a technology (online update function) that downloads an update program through a network to update a program.

CITATION LIST

Patent Literature

PATENT LITERATURE 1: Japanese Laid-Open Patent Publication No. 2015-37938

SUMMARY OF INVENTION

According to an embodiment, a control apparatus according to the present disclosure is a control apparatus configured to communicate with a plurality of on-vehicle control devices through in-vehicle communication lines, and includes an acquisition unit configured to acquire electric energy of a battery supplying electric power to the plurality of on-vehicle control devices, and a control unit configured to instruct, in a case where predicted electric energy of the battery at a time when a process by a target device that is one of the plurality of on-vehicle control devices is completed is lower than a first threshold, other on-vehicle control devices to stop respective processes by the other on-vehicle control devices executed in parallel with the process by the target device.

According to another embodiment, a control method according to the present disclosure is a control method for controlling a plurality of on-vehicle control devices by a control apparatus that communicates with the plurality of on-vehicle control devices through in-vehicle communication lines, and the method includes the steps of acquiring electric energy of a battery supplying electric power to the plurality of on-vehicle control devices, and instructing, in a case where predicted electric energy of the battery at a time when a process by a target device that is one of the plurality of on-vehicle control devices is completed is lower than a threshold, other on-vehicle control devices to stop respective processes by the other on-vehicle control devices executed in parallel with the process by the target device.

According to still another embodiment, a computer program according to the present disclosure is a computer program for causing a computer to function as a control apparatus configured to communicate with a plurality of on-vehicle control devices through in-vehicle communication lines, and the computer program causes the computer to function as: an acquisition unit configured to acquire electric energy of a battery supplying electric power to the plurality of on-vehicle control devices, and a control unit configured to instruct, in a case where predicted electric energy of the battery at a time when a process by a target device that is one of the plurality of on-vehicle control devices is completed is lower than a threshold, other on-vehicle control devices to stop respective processes by the other on-vehicle control devices executed in parallel with the process by the target device.

DESCRIPTION OF EMBODIMENTS

Problems to be Solved by Disclosure

Figure 1:
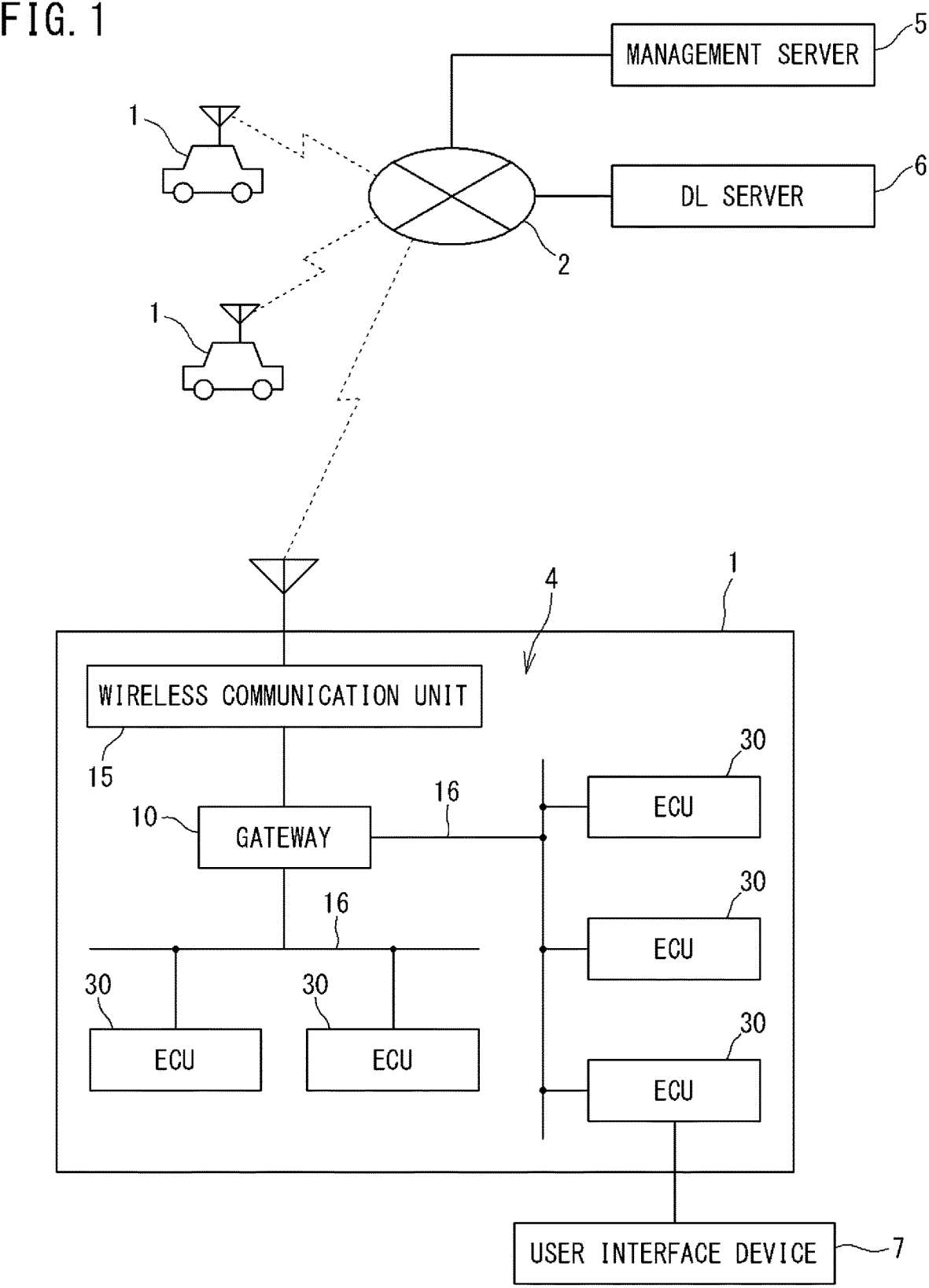
FIG. 1 is a diagram showing an overall configuration of a program update system.

In the automotive field in recent years, vehicles have progressed in functionality, and a diverse range of on-vehicle devices are installed in vehicles. Accordingly, vehicles are equipped with large numbers of control devices, so-called ECUs (Electronic Control Units), for controlling these on-vehicle devices.

There are various types of ECUs such as: traveling-related ECUs that control an engine, a brake, an EPS (Electric Power Steering), etc., in response to operations on an accelerator, a brake, and a handle; body-related ECUs that control ON/OFF of interior lights and headlights, sound of an alarm unit, etc., in response to switch operations performed by an occupant; and meter-related ECUs that control operations of meters arranged near the driver's seat.

Generally, each ECU consists of an arithmetic processing unit such as a microcomputer, and implements control of an on-vehicle device by reading out a control program stored in an ROM (Read Only Memory) and executing the read control program.

Control programs of ECUs may differ depending on the destinations, grades, and the like of vehicles. Therefore, old versions of control programs need to be overwritten with new versions of control programs in response to version upgrading of control programs. Further, data required in executing the control program, such as map information and control parameters need to be overwritten.

In a case where the other process is executed in parallel to the process such as the online update process disclosed in Patent Literature 1 in the vehicle, if electric power of a battery is deficient before completion of the update process, the update process is unintentionally stopped.

An object in an aspect of the present disclosure is to provide a control apparatus, a control method, and a computer program that each can prevent the process from being unintentionally stopped due to deficiency of the electric power even in the case where a plurality of processes is executed in parallel by on-vehicle devices.

Effects of Disclosure

According to the present disclosure, even in the case where a plurality of processes is executed in parallel by on-vehicle devices, it is possible to prevent the process from being unintentionally stopped due to deficiency of the electric power.

DESCRIPTION OF EMBODIMENTS

The present embodiment includes at least the following.

(1) A control apparatus included in the present embodiment is a control apparatus configured to communicate with a plurality of on-vehicle control devices through in-vehicle communication lines, and includes an acquisition unit configured to acquire electric energy of a battery supplying electric power to the plurality of on-vehicle control devices, and a control unit configured to instruct, in a case where predicted electric energy of the battery at a time when a process by a target device that is one of the plurality of on-vehicle control devices is completed is lower than a first threshold, other on-vehicle control devices to stop respective processes by the other on-vehicle control devices executed in parallel with the process by the target device.

This makes it possible to suppress power consumption by the processes by the other on-vehicle control devices, and to secure the electric energy of the battery for completion of the process by the target device. As a result, it is possible to prevent the process by the target device from being unintentionally stopped due to deficiency of the electric power.

(2) Preferably, the process by the target device is an update process of a control program during stoppage of a vehicle.

This makes it possible to prevent the update process of the control program by the target device during stoppage of the vehicle from being unintentionally stopped due to deficiency of the electric power.

(3) Preferably, in a case where a plurality of processes by the other on-vehicle control devices is executed in parallel, the control unit determines a process to be stopped among the plurality of processes based on priority set for each process.

Previously setting appropriate priority makes it possible to stop the process with low priority without stopping the process with high priority among the processes by the other on-vehicle control devices. As a result, the convenience of the user is not largely impaired.

(4) Preferably, in a case where a plurality of processes by the other on-vehicle control devices is executed in parallel, the control unit determines a process to be stopped among the plurality of processes based on user operation to select the process to be stopped.

This enables the user to select the stoppable process among the processes by the other on-vehicle control devices. As a result, the convenience of the user is not largely impaired.

(5) Preferably, in a case where a reduction speed of the battery is higher than a reference speed described below, the control unit further instructs the other on-vehicle control devices to stop the respective processes, the reference speed being a speed at which the electric energy of the battery is reduced to electric energy corresponding to the first threshold before completion of the process by the target device.

In the case where the reduction speed of the battery is higher than the reference speed, it is highly possible that the electric energy of the battery becomes lower than the threshold before completion of the process by the target device. Therefore, causing the other on-vehicle control devices to stop the respective processes makes it possible to suppress power consumption by the processes by the other on-vehicle control devices, and to secure the electric energy of the battery for completion of the process by the target device. As a result, it is possible to prevent the process by the target device from being unintentionally stopped due to deficiency of the electric power.

(6) Preferably, the first threshold is a value obtained by imparting a predetermined margin to electric energy necessary for a process to interrupt the process by the target device.

If the electric energy of the battery is reduced to the electric energy necessary for the process to interrupt the process by the target device, the process by the target device cannot be interrupted and is stopped. Therefore, causing the other on-vehicle control devices to stop the respective processes before the electric energy of the battery is reduced to the electric energy necessary for the process to interrupt the process by the target device makes it possible to prevent the process by the target device from being unintentionally stopped due to deficiency of the electric power.

(7) Preferably, in a case where the electric energy of the battery is lower than a second threshold that is larger than the first threshold, the control unit instructs the other on-vehicle control devices to stop the respective processes.

Appropriately setting the second threshold makes it possible to eliminate necessity of the determination in the case where the electric energy of the battery is sufficient, and to perform control by the control unit when it is possible that the electric energy of the battery is deficient. As a result, it is possible to prevent the process by the target device from being unintentionally stopped due to deficiency of the electric power.

(8) Preferably, the second threshold is a value obtained by imparting a predetermined margin to electric energy necessary for completion of the process by the target device.

This makes it possible to eliminate necessity of the determination in the case where the electric energy of the battery is sufficient for completion of the process by the target device, and to perform control by the control unit when it is possible that the electric energy of the battery is deficient.

(9) A control method included in the present embodiment is a method for controlling the on-vehicle control devices by the control apparatus according to any one of (1) to (8).

Such a control method achieves effects similar to the effects by the control apparatus according to (1) to (8) described above.

(10) A computer program included in the present embodiment causes a computer to function as the control apparatus according to any one of (1) to (8).

Such a computer program achieves effects similar to the effects by the control apparatus according to (1) to (8) described above.

DETAILED DESCRIPTION OF EMBODIMENTS

Some preferred embodiments are described below with reference to drawings. In the following description, the same parts and components are denoted by the same reference numerals. The same parts and components have the same names and functions. Accordingly, description of the parts and components is not repeated.

First Embodiment

[Overall Configuration of System]

FIG. 1 is a diagram showing an overall configuration of a program update system according to an embodiment of the present invention.

As shown in FIG. 1, the program update system of this embodiment includes vehicles 1, a management server 5, and a DL (download) server 6 that are able to communicate with each other via a wide-area communication network 2.

The management server 5 manages update information on the vehicles 1. The DL server 6 stores an update program. The management server 5 and the DL server 6 are operated by, for example, the automobile manufacturer of the vehicles 1, and are able to communicate with large numbers of vehicles 1 owned by users registered as members in advance.

Each vehicle 1 is equipped with an in-vehicle network (communication network) 4 that includes a plurality of ECUs 30 and a gateway 10 connected via in-vehicle communication lines 16, a wireless communication unit 15, and various kinds of on-vehicle devices (not shown) controlled by the respective ECUs 30. The on-vehicle devices include a user interface device 7. The user interface device 7 is, for example, a display or a touch panel.

A plurality of communication groups, each being formed by the plurality of ECUs 30 bus-connected to the common in-vehicle communication lines, are present in the vehicle 1, and the gateway 10 relays communication between the communication groups.

The wireless communication unit 15 is communicably connected to the wide-area communication network 2 such as a mobile phone network, and is connected to the gateway 10 via an in-vehicle communication line. The gateway 10 transmits information received by the wireless communication unit 15 from external devices such as the management server 5 and the DL server 6 through the wide-area communication network 2, to the ECUs 30 through the in-vehicle communication lines 16.

The gateway 10 transmits information obtained from the ECUs 30 to the wireless communication unit 15, and the wireless communication unit 15 transmits the information to the external devices such as the management server 5.

Further, the ECUs 30 transmit and receive information through the in-vehicle communication lines with one another.

As for the wireless communication unit 15 installed in the vehicle 1, a device possessed by the user, such as a mobile phone, a smart phone, a tablet-type terminal, and a notebook PC (Personal Computer) is conceivable, in addition to an on-vehicle dedicated communication terminal.

FIG. 1 shows an exemplary case where the gateway 10 communicates with the external devices via the wireless communication unit 15. However, if the gateway 10 has a wireless communication function, the gateway 10 itself may wirelessly communicate with the external devices such as the management server 5.

In the program update system shown in FIG. 1, the management server 5 and the DL server 6 are configured as separate servers. However, these serves 5 and 6 may be configured as a single server unit. Further, each of the management server 5 and the DL server 6 may include a plurality of units.

[Internal Configuration of Gateway]

Figure 2:
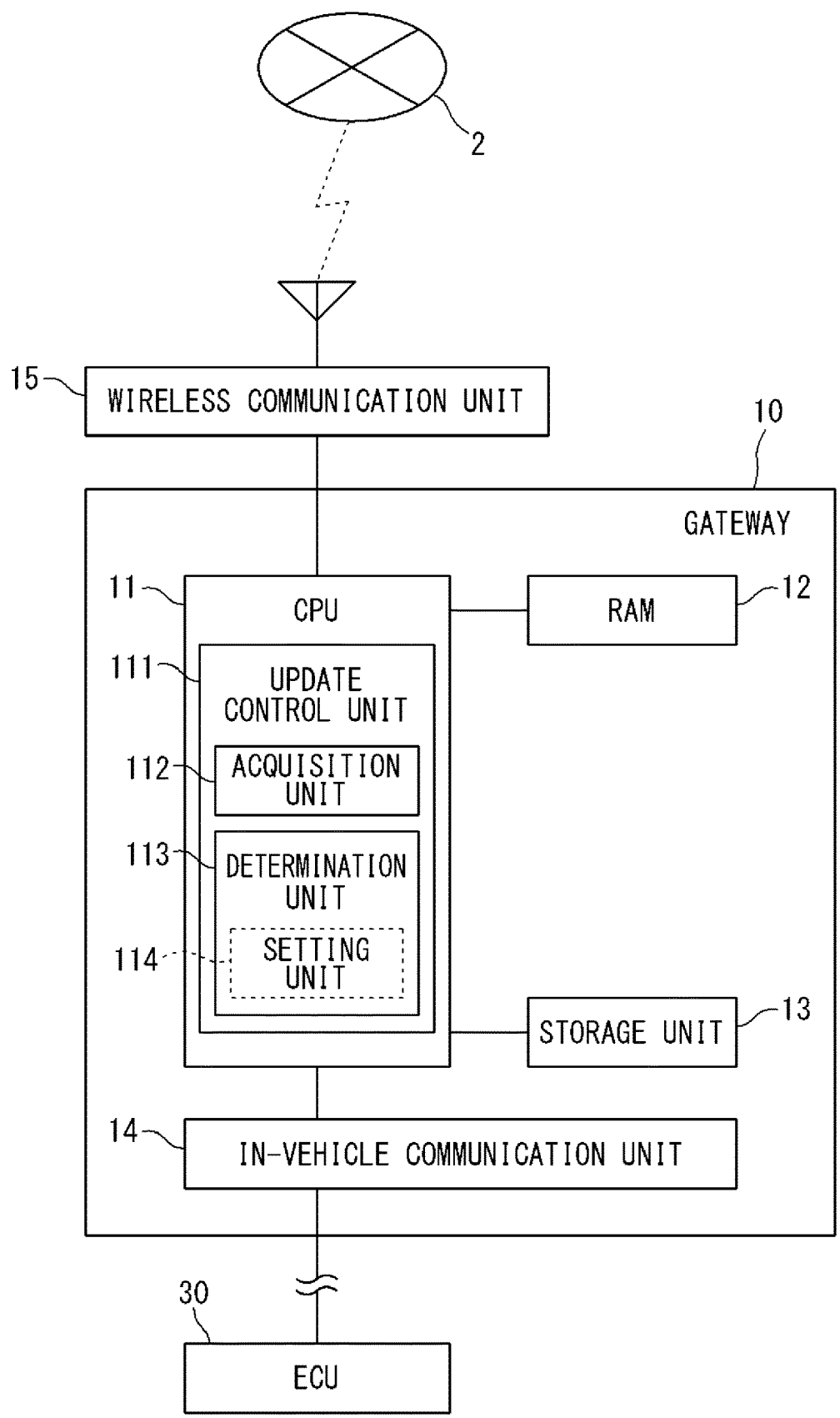
FIG. 2 is a block diagram showing an internal configuration of a gateway.

FIG. 2 is a block diagram showing the internal configuration of the gateway 10.

As shown in FIG. 2, the gateway 10 includes a CPU 11, a RAM (Random Access Memory) 12, a storage unit 13, an in-vehicle communication unit 14, and the like. Although the gateway 10 is connected to the wireless communication unit 15 via the in-vehicle communication line, the gateway 10 and the wireless communication unit 15 may be configured as a single unit.

The CPU 11 causes the gateway 10 to function as a relay device for relaying various kinds of information, by reading out one or a plurality of programs stored in the storage unit 13 to the RAM 12 and executing the read programs.

The CPU 11 can execute a plurality of programs in parallel by switching between the plurality of programs in a time sharing manner, for example. Note that the CPU 11 may be a representative of a plurality of CPU groups. In this case, the function implemented by the CPU 11 is implemented by the plurality of CPU groups in cooperation with one another. The RAM 12 consists of a memory element such as an SRAM (Static RAM) or a DRAM (Dynamic RAM), and temporarily stores therein programs to be executed by the CPU 11, data required in executing the programs, and the like.

A computer program to be executed by the CPU 11 can be transferred in a state of being recorded in a well-known recording medium such as a CD-ROM and a DVD-ROM, or may be transferred by data transmission from a computer device such as a server computer.

In this regard, the same applies to a computer program to be executed by a CPU 31 of the ECU 30 (refer to FIG. 3) described below, and a computer program to be executed by a CPU 51 of the management server 5 (refer to FIG. 4) described below.

Note that, in the following description, data transfer (transmission) from a high-order device to a low-order device is also referred to as "downloading".

The storage unit 13 consists of, for example, a nonvolatile memory element such as a flash memory or an EEPROM. The storage unit 13 stores programs to be executed by the CPU 11, data required in executing the programs, and the like. The storage unit 13 further stores therein update programs of the respective ECUs 30 to be downloaded that are received from the DL server 6.

The plurality of ECUs 30 is connected to the in-vehicle communication unit 14 via the in-vehicle communication lines arranged in the vehicle 1. The in-vehicle communication unit 14 performs communication (also referred to as CAN (Controller Area Network) communication) with the ECUs 30 in accordance with a standard such as CAN. The communication standard adopted by the in-vehicle communication unit 14 is not limited to CAN, and may adopt standard such as CANFD (CAN with Flexible Data Rate), LIN (Local Interconnect Network), Ethernet (registered trademark), or MOST (Media Oriented Systems Transport: MOST is a registered trademark). The plurality of in-vehicle communication lines may include an in-vehicle communication line different in communication standard.

The in-vehicle communication unit 14 transmits information provided from the CPU 11 to target ECUs 30, and provides information received from the ECUs 30 to the CPU 11. The in-vehicle communication unit 14 may communicate with the ECUs 30 in accordance with other communication standards that are used for the in-vehicle network 4, apart from the above communication standards.

The wireless communication unit 15 consists of a wireless communication apparatus including an antenna and a communication circuit that executes transmission/reception of radio signals through the antenna. The wireless communication unit 15 is able to communicate with the external devices when connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a wired communication unit that serves as a relay device inside the vehicle 1 may be adopted. The wired communication unit has a connector to which a communication cable conforming to a standard such as USB (Universal Serial Bus) or RS232C is connected, and performs wired communication with another communication device connected thereto via the communication cable.

If the other communication device and the external device such as the management server 5 can wirelessly communicate with each other via the wide-area communication network 2, the external device and the gateway 10 are able to communicate with each other through a communication path consisting of the external device, the other communication device, the wired communication unit, and the gateway 10, in this order.

[Internal Configuration of ECU]

Figure 3:
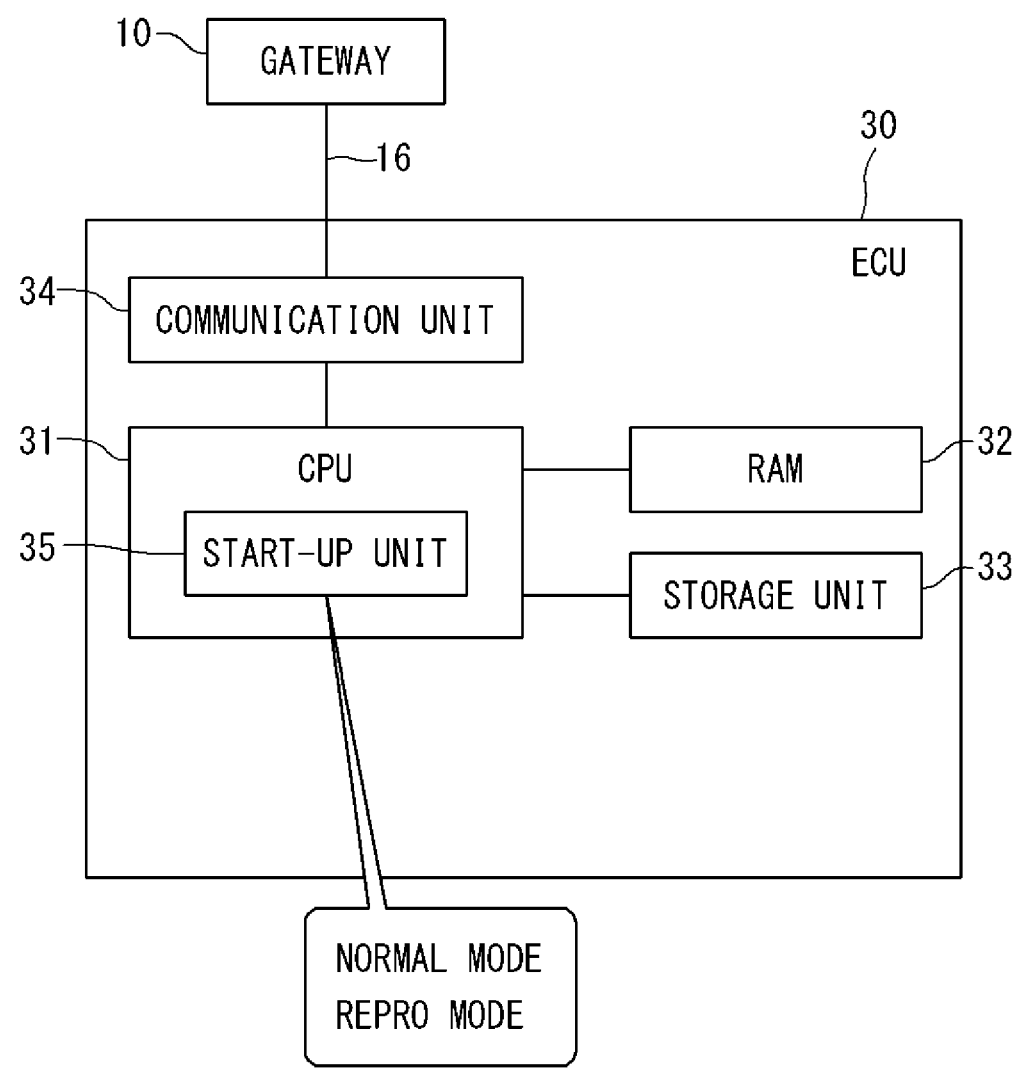
FIG. 3 is a block diagram showing an internal configuration of an ECU.

FIG. 3 is a block diagram showing the internal configuration of an ECU 30.

As shown in FIG. 3, the ECU 30 includes the CPU 31, a RAM 32, a storage unit 33, a communication unit 34, and the like. The ECU 30 is an on-vehicle control device that individually controls a target device installed in the vehicle 1. Examples of the types of the ECU 30 include a power-supply control ECU, an engine control ECU, a steering control ECU, and a door lock control ECU.

The CPU 31 controls the operation of a target device that the CPU 31 is in charge of, by reading out one or a plurality of programs previously stored in the storage unit 33 to the RAM 32 and executing the read programs. The CPU 31 may also be a representative of a plurality of CPU groups, and the control by the CPU 31 may be control by the plurality of CPU groups in cooperation with one another.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

The storage unit 33 stores programs to be read and executed by the CPU 31. Information stored in the storage unit 33 includes, for example, a computer program that causes the CPU 31 to execute information processing for controlling a target device to be controlled, inside the vehicle, and a control program that is data to be used to execute the program, such as parameters and map information.

The gateway 10 is connected to the communication unit 34 via the in-vehicle communication line arranged in the vehicle 1. The communication unit 34 communicates with the gateway 10 in accordance with a standard such as CAN, Ethernet, or MOST.

The communication unit 34 transmits information provided from the CPU 31 to the gateway 10, and provides information received from the gateway 10 to the CPU 31. The communication unit 34 may communicate with the gateway 10 in accordance with other communication standards that are used for the on-vehicle network, apart from the above communication standards.

The CPU 31 of the ECU 30 includes a start-up unit 35 that switches the mode of control performed by the CPU 31, between a "normal mode" and a "reprogramming mode" (hereinafter also referred to as "repro mode").

The normal mode is a control mode in which the CPU 31 of the ECU 30 executes original control for the target device (e.g., engine control for fuel engine, or door lock control for door lock motor).

The reprogramming mode is a control mode in which the CPU 31 updates the control program used for controlling the target device.

In other words, the reprogramming mode is a control mode in which the CPU 31 performs erasing/overwriting of the data of the control program from/on an ROM area in the storage unit 33. Only when the CPU 31 is in this control mode, the CPU 31 is allowed to update the control program stored in the ROM area in the storage unit 33 to a new version of the control program.

When the CPU 31, in the repro mode, writes the new version of the control program into the storage unit 33, the start-up unit 35 temporarily restarts (resets) the ECU 30, and executes a verifying process on the storage area where the new version of the control program has been written.

After completion of the verifying process, the start-up unit 35 operates the CPU 31 with the updated control program.

Update of the control program with use of an update program downloaded from the DL server 6 to the ECU 30 through the gateway 10, is also referred to as online update.

[Internal Configuration of Management Server]

Figure 4:
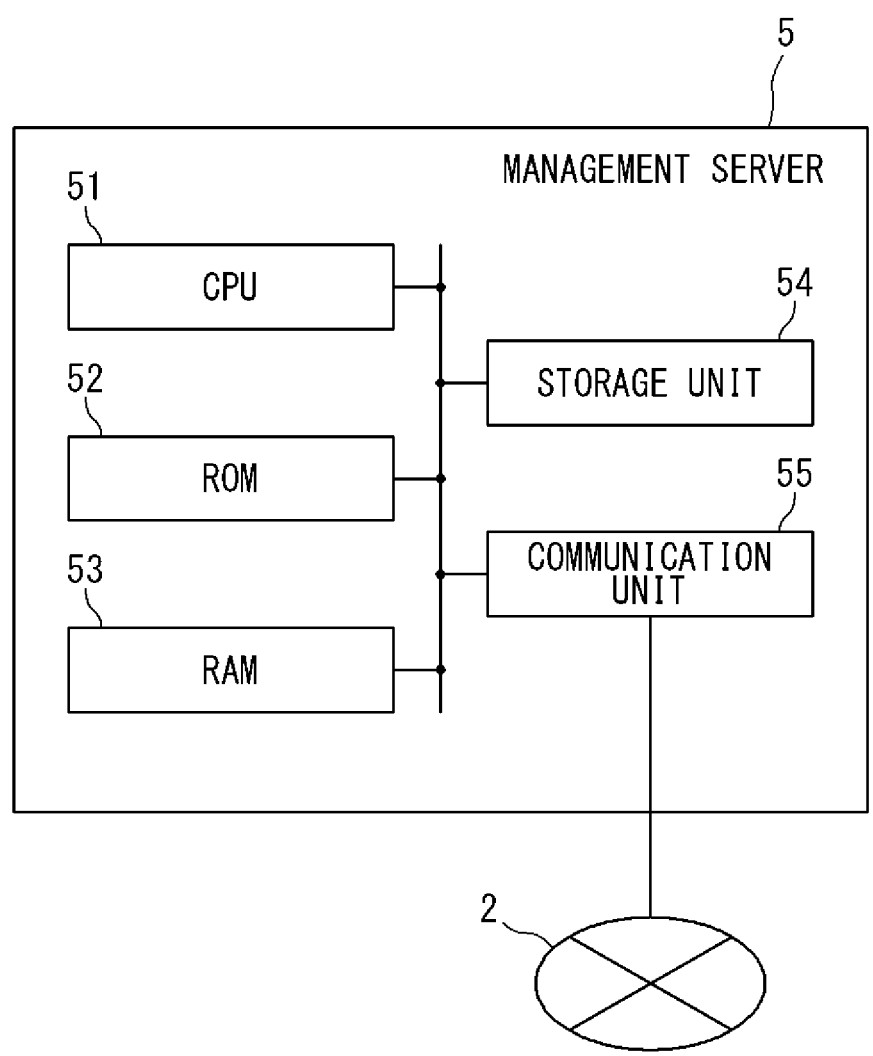
FIG. 4 is a block diagram showing an internal configuration of a management server.

FIG. 4 is a block diagram showing the internal configuration of the management server 5.

As shown in FIG. 4, the management server 5 includes the CPU 51, a ROM 52, a RAM 53, a storage unit 54, a communication unit 55, and the like.

By reading out one or a plurality of programs previously stored in the ROM 52 to the RAM 53 and executing the read programs, the CPU 51 controls the operation of each hardware component, and causes the management server 5 to function as an external device that is able to communicate with the gateway 10. The CPU 51 may also be a representative of a plurality of CPU groups, and the function implemented by the CPU 51 may be implemented by the plurality of CPU groups in cooperation with one another.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process in accordance with a predetermined communication standard. The communication unit 55 executes the communication process when connected to the wide-area communication network 2 such as a mobile phone network. The communication unit 55 transmits information provided from the CPU 51 to external devices via the wide-area communication network 2, and provides information received via the wide-area communication network 2 to the CPU 51.

[Control Program Update Sequence]

Figure 5:
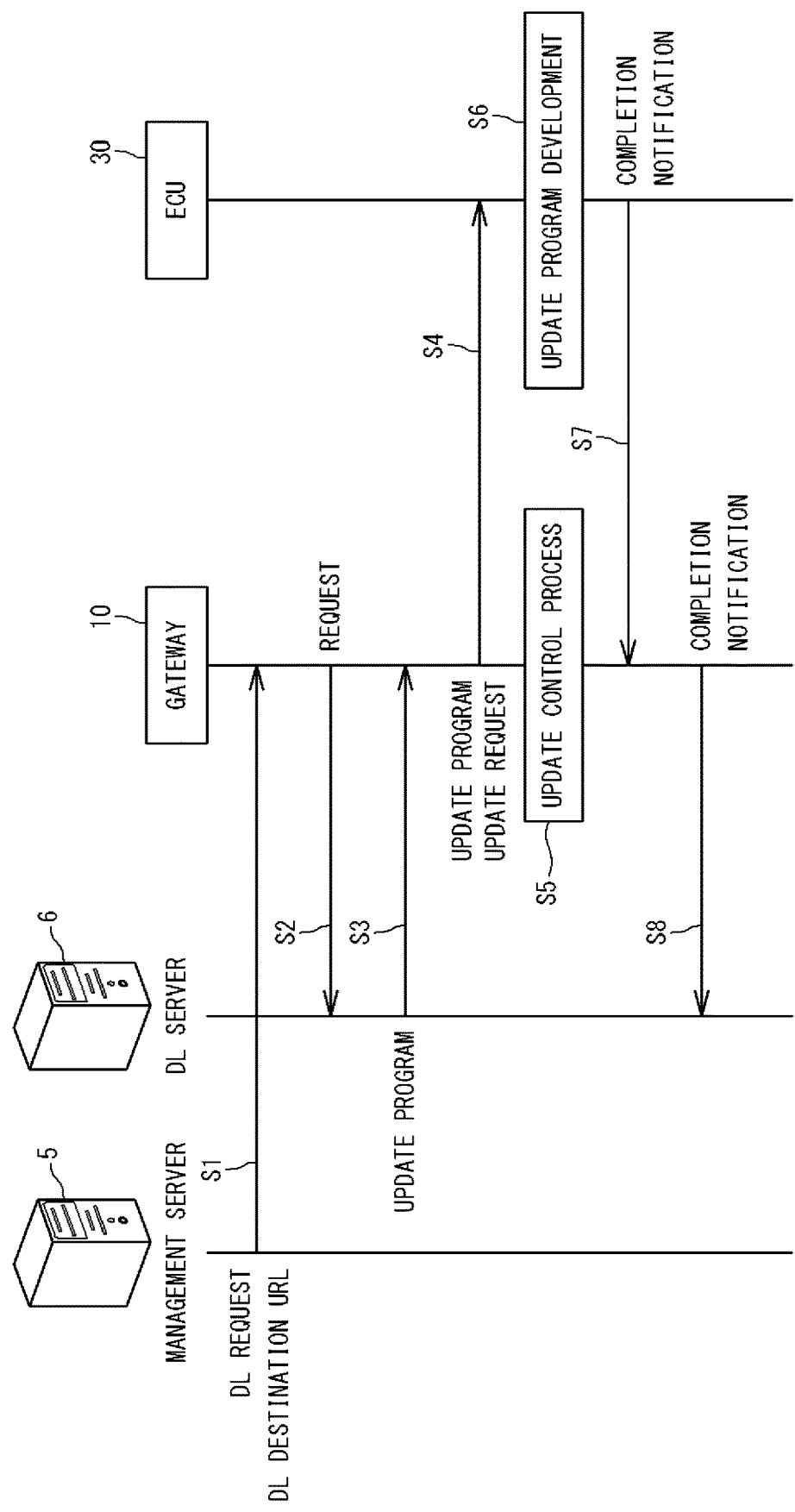
FIG. 5 is a sequence diagram showing an example of flow of online update of a control program, executed by the program update system.

FIG. 5 is a sequence diagram showing an example of flow of control program online update executed in the program update system of the present embodiment. One or a plurality of update programs is stored in the DL server 6. As an example, the management server 5 determines timing when the control programs for the ECUs of a previously-registered vehicle 1 are updated. The update timing may be set by, for example, the automobile manufacturer of the vehicle 1.

The control program includes not only the program itself but also data used in execution of the program, such as the parameters and the map information. The representative thereof is represented as the "control program". Accordingly, the update program includes not only the program for updating the program but also data for updating the data used in execution of the program.

When the control program update timing arrives, the management server 5 notifies the gateway 10 of the corresponding vehicle 1 of update (step S1). In step S1, a download request and update information including destination URL where the update program is stored and a size of the update program are transmitted from the management server 5 to the gateway 10.

Upon receiving the update notification from the management server 5, the gateway 10 relays the update program downloaded from the DL server 6, to the ECU 30 (hereinafter, target ECU) in which the control program is updated. In other words, the gateway 10 requests download of the update program to the DL server 6 based on the update information (step S2).

Upon receiving the download request from the gateway 10, the DL server 6 transmits the update program to be downloaded to the gateway 10, and requests update of the control program (step S3).

Upon downloading the update program, the gateway 10 transmits the update program to the target ECU, and requests the target ECU to update the control program (step S4).

Upon requesting the target ECU to update the control program, the gateway 10 executes an update control process in a case where the update is to be executed during stoppage of the vehicle 1 (step S5). The update control process includes an acquisition process and a determination process described below.

Acquisition process: a process to acquire a remaining level of a battery (hereinafter, also referred to as remaining battery level)

Determination process: a process to determine whether to stop each process under operation Upon receiving a control signal based on the update control process together with the update program from the gateway 10, the target ECU develops the update program based on the control signal, and executes the update process to update the control program (step S6). If necessary in the update control process in step S5, the gateway 10 outputs the control signal to the target ECU during the update process in step S6. The target ECU continues or interrupts the update process based on the control signal.

Upon completing update of the control program, the target ECU 30 notifies the gateway 10 of update completion (step S7). Upon receiving the notification, the gateway 10 notifies the DL server 6 of update completion (step S8).

[Functional Configuration of Gateway]

As shown in FIG. 2, the CPU 11 of the gateway 10 includes an update control unit 111 as a function to execute the update control process. The update control unit 111 includes an acquisition unit 112 executing the acquisition process, and a determination unit 113 executing the determination process.

The acquisition unit 112 acquires a remaining battery level SoC by monitoring a frame transmitted from the ECU controlling the battery (not shown).

The determination unit 113 determines whether each process under operation is continuable (first determination process). The determination unit 113 compares the remaining battery level SoC with a threshold Th1 for the first determination process. The threshold Th1 is a threshold indicating electric energy predicted to be necessary for at least completion of the update process. The determination unit 113 performs determination based on a result of the comparison. More specifically, when the remaining battery level SoC is larger than the threshold Th1 (SoC>Th1), the determination unit 113 determines to continue all of the processes under operation including the update process (first determination result). This is because, in this case, the electric energy predicted to be necessary for completion of the update process has been already charged in the battery at the determination time point.

When the remaining battery level SoC is lower than or equal to the threshold Th1 (SoC≤Th1), the remaining battery level SoC is lower than the electric energy predicted to be necessary for completion of the update process at the determination time point. Therefore, the determination unit 113 further determines whether to interrupt the update process (second determination process). The determination unit 113 compares the remaining battery level SoC with a threshold Th2 (Th2<Th1) for the second determination process. The threshold Th2 corresponds to a lower limit value Whm of the remaining battery level, and indicates the electric energy necessary for a process (interruption process) to interrupt at least the update process. The determination unit 113 performs determination based on a result of the comparison. More specifically, when the remaining battery level SoC is reduced to the threshold Th2 (SoC≤Th2), the determination unit 113 determines to interrupt the update process (second determination result). This is because, if the remaining battery level SoC is reduced more, the interruption process cannot be executed.

In a case where the update process is interrupted by the update control process described below, the determination unit 113 determines whether to resume the update process (third determination process). The determination unit 113 compares the remaining battery level SoC with the above-described threshold Th2. The determination unit 113 performs the determination based on a result of the comparison. More specifically, in a case where the remaining battery level SoC is larger than the threshold Th2 (SoC>Th2), the determination unit 113 determines to resume the interrupted update process.

When the remaining battery level SoC is lower than or equal to the threshold Th1 and is larger than the threshold Th2 (SoC≤Th1 and SoC>Th2), the determination unit 113 determines to stop processes under operation other than the update process as necessary (third determination result). This is because, in this case, continuation of the current operation may cause deficiency of the electric energy necessary for completion of the update process.

Preferably, the determination unit 113 includes a setting unit 114 that sets the above-described thresholds Th1 and Th2. The setting unit 114 may read out the threshold previously stored in the storage unit 13, or may substitute parameters in a previously-stored calculation expression to calculate the threshold. For example, the setting unit 114 calculates the threshold Th1 based on an attribute of the target ECU and the size of the update program that are previously stored. More specifically, the setting unit 114 multiplies a time T required for the update process by the target ECU by a previously-stored power consumption p per unit time by the target ECU, thereby calculating a predicted electric energy consumption P1 (P1=T×p). Further, the setting unit 114 imparts a preset margin m1 to the predicted electric energy consumption P1 to determine the threshold Th1 (Th1=p1+m1).

Note that the margin m1 may be any of a positive value and a negative value. When the margin m1 is set to a positive value, the threshold Th1 becomes larger than the predicted electric energy consumption P1. As a result, the first determination process is performed as a determination process on a safe side with margin in the remaining battery level SoC. In contrast, when the margin m1 is set to a negative value, the threshold Th1 becomes lower than the predicted electric energy consumption P1. Setting an absolute value of the margin m1 to an appropriate value can give preference to easiness in execution of the update process over execution of the first determination process on an excess safe side. Further, the margin m1 may be imparted not only by addition to the predicted electric energy consumption P1 but also by multiplication.

Note that the required time T may be a total time T1 from start to completion of the update process in the target ECU, or may be a remaining time T2 from the determination time point to completion of the update process. In the former case, the determination unit 113 can obtain the required time T by dividing a data size S1 of the update program by a data writing speed v by the target ECU (T=T1=S1/v). When the total time T1 is used, necessity of calculation of the required time T for each determination time point is eliminated, which facilitates the determination process. In the latter case, the determination unit 113 can obtain the required time T by dividing a data size S2 of an unprocessed part of the update program by the data writing speed v by the target ECU (T=T2=S2/v). When the remaining time T2 is used, the required time T can be calculated based on the determination time point, and the required time T can be obtained with high accuracy based on progress of the update process.

The threshold Th2 is previously stored in the storage unit 13. Alternatively, the setting unit 114 may previously store electric energy P2 necessary for an interruption process to interrupt the update process, and may calculate the threshold Th2 with use of the electric energy P2. The interruption process includes a process to write a position (address) of a completed part of the update process, in the storage unit 13. The electric energy P2 includes electric energy required for the process to write the address in the storage unit 13. The interruption process may further include a process to read out the address from the storage unit 13 and to resume the update process from the position of the update program indicated by the address. For example, the setting unit 114 calculates the threshold Th2 by imparting a preset margin m2 to the electric energy P2 previously stored (Th2=P2+m2). The margin m2 may also be any of a positive value and a negative value.

When the margin m2 is set to a positive value, the second determination process is performed as a determination process on a safe side as with the above-described case where the margin m1 is set to the positive value. Setting the margin m2 to a negative value can give preference to easiness in execution of the update process over execution of the second determination process on an excess safe side, as with the above-described case where the margin m1 is set to the negative value. Further, the margin m2 may be imparted not only by addition to the electric energy P2 but also by multiplication.

The update control unit 111 executes the update control process based on the determination result of the determination unit 113. In the case of the second determination result, the update control unit 111 instructs the target ECU to interrupt the update process. More specifically, the update control unit 111 generates a frame including data instructing interruption of the update process, and causes the in-vehicle communication unit 14 to transmit the frame to the target ECU.

In the case of the third determination result, the update control unit 111 executes a stop process. The stop process is a process to stop the processes under operation other than the update process as necessary. Examples of the processes other than the update process include reproduction of a movie by a movie player (not shown), reproduction of a music by a music player, and data download by various kinds of devices.

In a case where there is a plurality of processes under operation other than the update process, the update control unit 111 preferably determines the process to be stopped among the plurality of processes based on a predetermined selection criterion. In the first embodiment, the above-described predetermined selection criterion is a preset priority. Accordingly, the update control unit 111 previously stores the priority of each of the processes, and determines, as the process to be stopped, the process lower in priority than the update process among the plurality of processes under operation. Further, in a case where there is a plurality of processes lower in priority than the update process, the update control unit 111 determines the process to be stopped in order of lower priority among the plurality of processes. The priority may be previously stored in the storage unit 13, or may be set or changed by the user. Alternatively, the above-described predetermined selection criterion may be at random.

In the case where there is the plurality of processes under operation other than the update process, the update control unit 111 more preferably stops the processes under operation other than the update process, in order (for example, in order of lower priority) until the reduction speed $\Delta Wh$ at which the electric energy of the battery is consumed becomes lower than a reference speed $\Delta$. The reduction speed $\Delta Wh$ is a reduction amount of the battery per unit time. The update control unit 111 can acquire the reduction speed $\Delta Wh$ of the battery (not shown) by monitoring the frame transmitted from the ECU controlling the battery. Further, the update control unit 111 calculates the reference speed $\Delta$ based on the remaining battery level SoC and the time necessary for completion of the update process.

The reference speed $\Delta$ is a speed at which the current remaining battery level is reduced to a lower limit value Whm (electric energy corresponding to threshold Th2) during a period before completion of the update process, namely, a change (reduction) amount per unit time. In a case where the reduction speed $\Delta Wh$ is larger (higher) than the reference speed $\Delta$, the predicted remaining battery level at competition of the update process is lower than the lower limit value Whm, namely, battery deficiency at completion of the update process is predicted.

The update control unit 111 can obtain the reference speed $\Delta$ by dividing a difference of the remaining battery level SoC from the lower limit value Whm by the above-described required time T ($\Delta=(SoC-Whm)/T$). Note that the required time T may be the total time T1 or the remaining time T2, as with the required time T used in calculation of the threshold Th1.

[Operation Flow]

Figure 6:
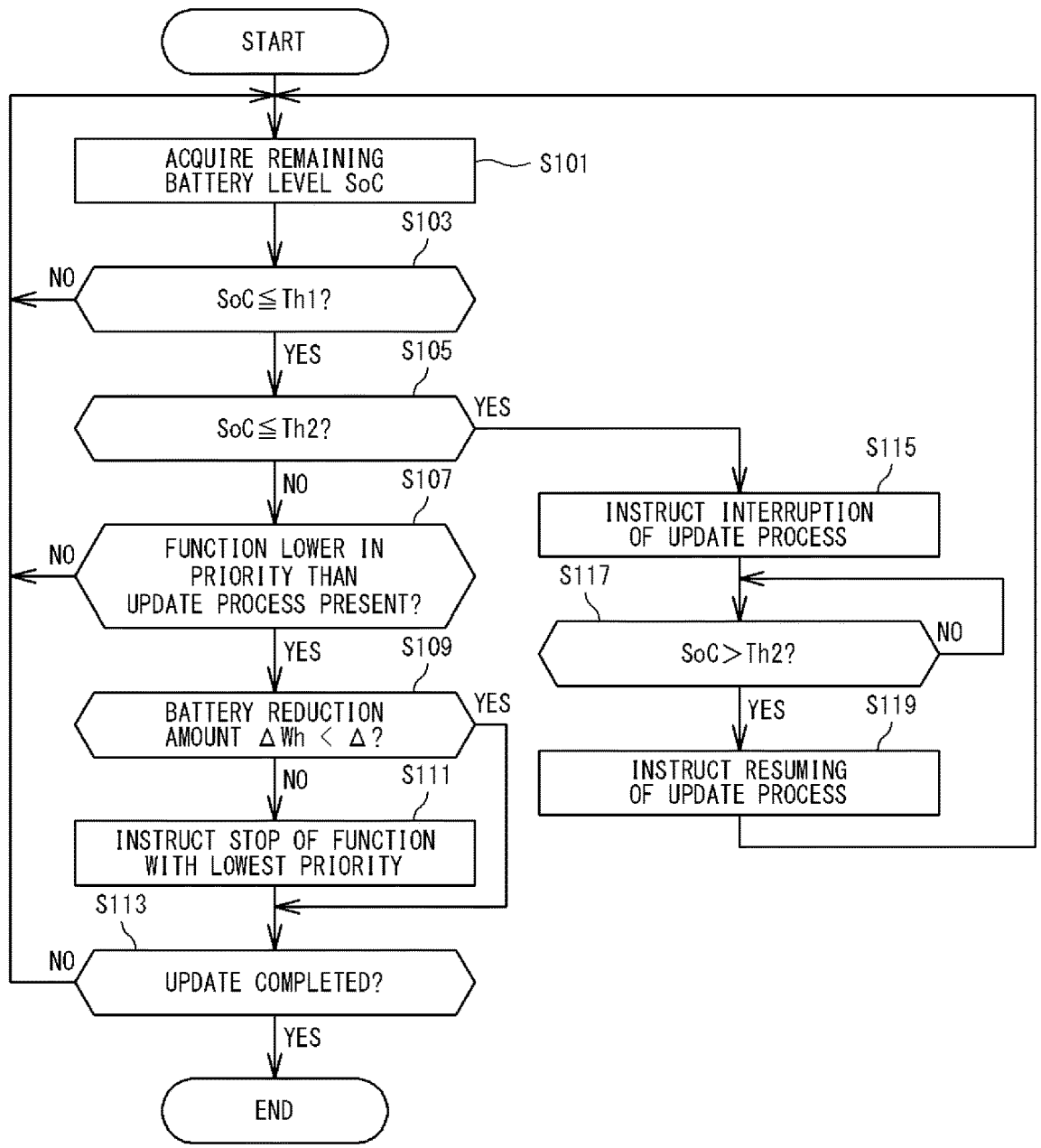
FIG. 6 is a flowchart showing a specific example of an update control process according to a first embodiment.

FIG. 6 is a flowchart showing a specific example of the update control process in step S5 of FIG. 5, in the program update system according to the first embodiment. The process shown in the flowchart of FIG. 6 is executed when the CPU 11 of the gateway 10 reads out one or a plurality of programs stored in the storage unit 13 to the RAM 12, and executes the read programs to achieve the functions shown in FIG. 2. The process in FIG. 6 is started when the gateway 10 passes the update program to the target ECU and requests the target ECU to update the control program (step S4 in FIG. 5) in the case where the update process of the control program is to be executed during stoppage of the vehicle 1.

As shown in FIG. 6, upon requesting the target ECU to perform the update process, the CPU 11 of the gateway 10 acquires the remaining battery level SoC by monitoring the frame transmitted from the ECU controlling the battery (not shown) (step S101).

The CPU 11 compares the acquired remaining battery level SoC with the threshold Th1. In a case where the remaining battery level SoC is larger than the threshold Th1 (NO in step S103), the CPU 11 skips subsequent processes. In this case, the update process by the target ECU is continued.

In a case where the remaining battery level SoC is lower than or equal to the threshold Th1 (YES in step S103), the CPU 11 further compares the remaining battery level SoC with the threshold Th2. In a case where the remaining battery level SoC is lower than or equal to the threshold Th1 and is larger than the threshold Th2 (NO in step S105), the CPU 11 executes the stop process. In other words, the CPU 11 confirms whether there is a process lower in priority than the update process among the processes under operation. In a case where there is no process lower in priority than the update process (NO in step S107), the CPU 11 skips subsequent processes. In this case, the update process by the target ECU is continued.

In a case where there is a process lower in priority than the update process among the processes under operation (YES in step S107), the CPU 11 causes the in-vehicle communication unit 14 to transmit the frame instructing the ECU performing the process to stop the process. As a result, the process by the ECU is stopped. The process higher in priority than the update process is continued. At this time, there is a plurality of corresponding processes, the CPU 11 instructs, for example, stop of the process with the lowest priority (step S111).

Preferably, the CPU 11 acquires the reduction speed ΔWh of the battery by monitoring the frame transmitted from the ECU controlling the battery, and compares the reduction speed ΔWh with the reference speed Δ. In a case where the reduction speed ΔWh is higher than or equal to the reference speed Δ (NO in step S109), the CPU 11 instructs stop of the process with the lowest priority (step S111). As a result, the process with the lowest priority is stopped. In a case where the reduction speed ΔWh is lower than the reference speed Δ (YES in step S109), the CPU 11 skips step S111. In other words, the CPU 11 does not instruct stop of the processes under operation. Thus, the processes under operation are continued.

The CPU 11 periodically repeats the above-described process (NO in step S113) until the update process by the target ECU is completed. Therefore, in the case where the plurality of processes lower in priority than the update process is under operation, the process is stopped in order of lower priority until the remaining battery level SoC becomes larger than or equal to the threshold Th2 corresponding to the lower limit value Whm or until the reduction speed ΔWh of the battery becomes lower than the reference speed Δ.

In a case where the remaining battery level SoC is reduced to the threshold Th2 (YES in step S105), the CPU 11 causes the in-vehicle communication unit 14 to transmit the frame instructing the target ECU to interrupt the update process (step S115). As a result, the interruption process is executed by the target ECU, and the update process is interrupted.

After the update process is interrupted, the CPU 11 continues monitoring of the remaining battery level SoC. Further, when charging progresses to a state where the remaining battery level SoC is larger than the threshold Th2 (YES in step S117), the CPU 11 causes the in-vehicle communication unit 14 to transmit a frame instructing the target ECU to resume the update process (step S119). As a result, the update process by the target ECU is resumed. When the update process is resumed, the CPU 11 periodically repeats the process from step S101 (NO in step S113) until the update process by the target ECU is completed.

Effects of First Embodiment

It is assumed that the above-described update control process is executed in the case where the online update is executed during stoppage of the vehicle 1 and, for example, the user inside the vehicle 1 turns on an air conditioner or reproduces a movie. In this case, if the remaining battery level becomes deficient before completion of the update process due to the processes under operation, the update process by the target ECU may be stopped on the way. If the update process is stopped on the way, the update program may be destroyed, which may cause failure of the update itself of the control program.

In the case where deficiency of the necessary electric energy before completion of the update process is predicted due to execution of the update control process according to the present embodiment in such a case, the processes by the other ECUs are automatically stopped. Therefore, the electric energy necessary for completion of the update process is secured in the battery. As a result, stoppage of the update process due to deficiency of the battery is avoided, and the update process is completely executed.

Note that, at this time, when the priority is previously set, the process lower in priority than the update process is stopped whereas the process higher in priority than the update process is not stopped. Thus, the operation higher in priority for the user than the update of the control program is not stopped. For example, in a case where a priority of operation of the air conditioner is set higher than the priority of update of the control program and a priority of reproduction of a movie is set lower than the priority of update of the control program, operation of the air conditioner is not stopped but reproduction of the movie is stopped. This does not largely impair the convenience of the user.

In contrast, there is a case where the remaining battery level becomes deficient before the update process is completed because the priority is set and the process with a high priority is not stopped. In the above-described example, continuation of operation of the air conditioner may cause deficiency of the remaining battery level before completion of the update process. At this time, in the update control process according to the present embodiment, if the remaining battery level is reduced to the electric energy necessary for the interruption process, the update process is interrupted until the battery is charged to the necessary electric energy or more. Further, after the battery is charged to the necessary electric energy or more, the update process is automatically resumed. As a result, even in the case where the update process is interrupted due to deficiency of the battery, the update process is automatically resumed at the time when the remaining battery level is secured. Therefore, the update process is completely executed.

Further, in the case where deficiency of the necessary electric energy before completion of the update process is predicted from the power consumption speed by the processes under operation, the processes by the other ECUs are stopped, and otherwise, the processes by the other ECUs are not stopped. Therefore, the processes more than necessary are not stopped. This does not largely impair the convenience of the user.

Second Embodiment

In the first embodiment, in the case where the deficiency of the necessary electric energy of the battery before completion of the update process is predicted during execution of the update process, the process determined based on the predetermined selection criterion among the processes under operation is automatically stopped. As another example, the process selected by the user may be stopped.

In the second embodiment, the stop process executed by the update control unit 111 includes a process to receive selection of a process to be stopped from the user and a process to stop the selected process. Therefore, preferably, the update control unit 111 previously stores a process stoppable in response to an instruction by the user. The process stoppable in response to an instruction by the user is a process not relating to traveling, for example, a process to operate the air conditioner and a process to reproduce a movie.

In a case where the process under operation other than the update process is a process stoppable in response to an instruction by the user, the update control unit 111 displays, on the user interface device 7, a display screen (selection screen) to receive user operation that instructs whether to stop the process. In the case where, other than the update process, there is the plurality of processes that is under operation and is stoppable in response to an instruction by the user, the selection screen receives selection of the process to be stopped among the plurality of processes. To display the selection screen on the user interface device 7, the update control unit 111 generates a frame that includes data instructing display of the selection screen, and causes the in-vehicle communication unit 14 to transmit the frame to the ECU controlling the user interface device 7.

Figure 7:
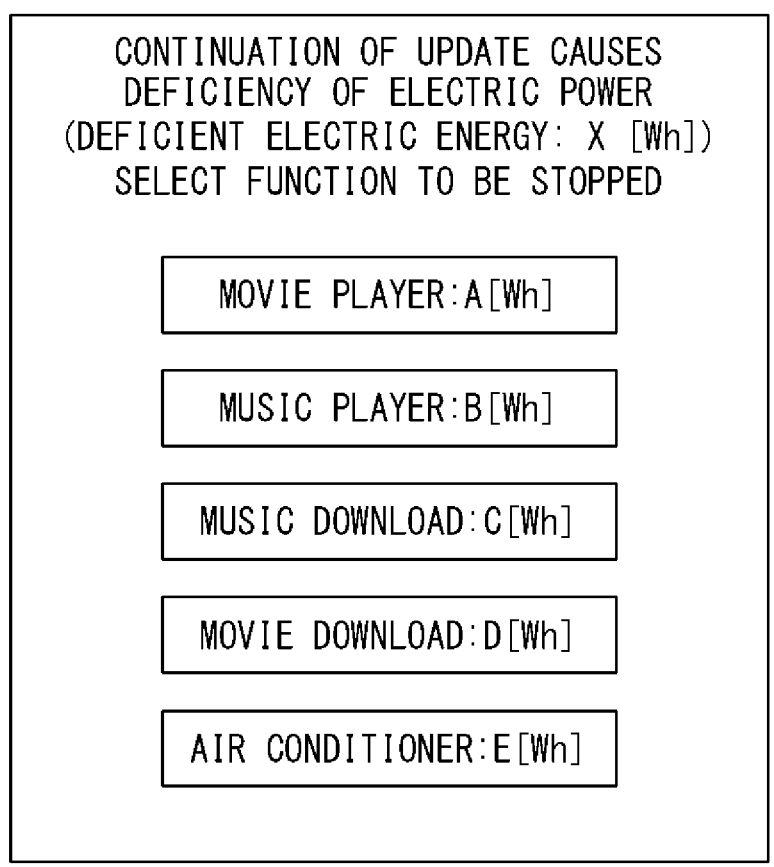
FIG. 7 is a diagram showing an example of a selection screen.

FIG. 7 is a diagram showing an example of the selection screen. As shown in FIG. 7, the selection screen includes display of the process stoppable in response to an instruction by the user among the processes under operation, in addition to notification that deficiency of the necessary electric energy before completion of the update process is predicted (power deficiency prediction notification). The selection screen receives user operation to select whether to stop the displayed process. In the example of FIG. 7, a plurality of processes including a reproduction process by the movie player, a reproduction process by the music player, a download process of music data, a download process of movie data, and operation of the air conditioner is selectable, and user operation (for example, touch operation) to instruct stop can be received for each process.

Preferably, the update control unit 111 displays a deficient electric energy X and electric energy consumptions A to E of the respective processes under operation on the selection screen. The deficient electric energy X is calculated by, for example, subtracting the electric energy consumption ($\Delta Wh \times T$) in a case where the reduction speed $\Delta Wh$ of the battery per unit time as described above is continued for the required time T, from the remaining battery level SoC. Each of the electric energy consumptions A to E of the respective processes under operation is calculated by multiplying the required time T by the power consumption per unit time obtained by monitoring the frame transmitted from each of the ECUs executing the respective processes. The electric energy is displayed on the selection screen, which enables the user to instruct stop of the suitable process.

Figure 8:
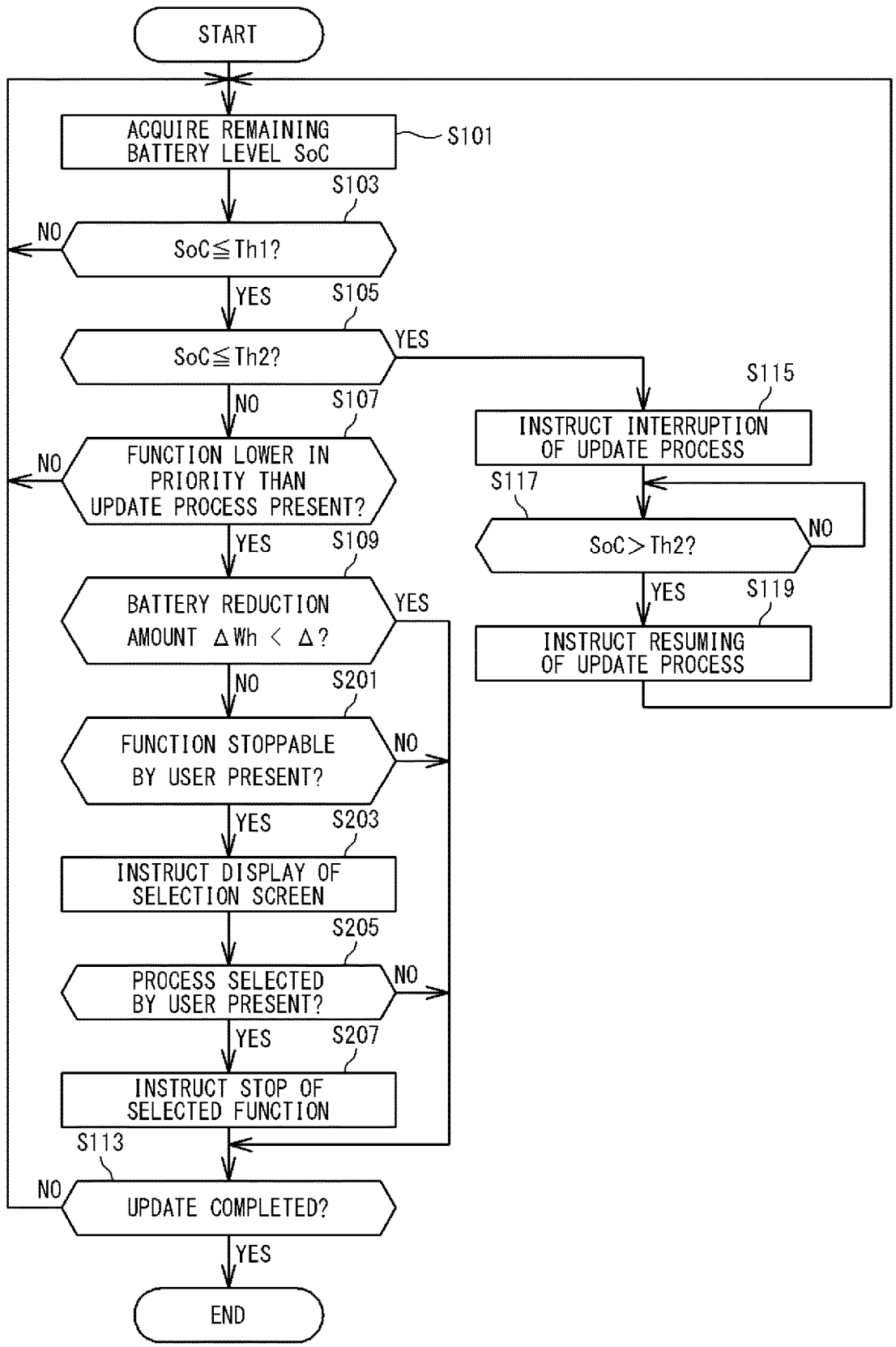
FIG. 8 is a flowchart showing a specific example of an update control process according to a second embodiment.

FIG. 8 is a flowchart showing a specific example of the update control process in step S5 of FIG. 5, in the program update system according to the second embodiment. The process shown in the flowchart of FIG. 8 is also executed when the CPU 11 of the gateway 10 reads out one or a plurality of programs stored in the storage unit 13 to the RAM 12, and executes the read programs to achieve the functions shown in FIG. 2. Note that, in the flowchart of FIG. 8, operation denoted by the same number in the flowchart of FIG. 6 is the same as the operation shown in the flowchart of FIG. 6. Therefore, description of the operation is not repeated.

In the second embodiment, as shown in FIG. 8, in a case where the remaining battery level SoC is lower than or equal to the threshold Th1 and is larger than the threshold Th2 (YES in step S103 and NO in step S105) and further there are processes lower in priority than the update process among the processes under operation (YES in step S107), the CPU 11 confirms whether the process stoppable in response to an instruction by the user is present among the processes lower in priority than the update process.

Preferably, the CPU 11 acquires the reduction speed $\Delta Wh$ of the battery by monitoring the frame transmitted from the ECU controlling the battery, and compares the reduction speed $\Delta Wh$ with the reference speed $\Delta$. In a case where the reduction speed $\Delta Wh$ is higher than or equal to the reference speed $\Delta$ (NO in step S109), the CPU 11 confirms whether the process stoppable in response to an instruction by the user is present among the processes under operation.

In the case where the process stoppable in response to an instruction by the user is present (YES in step S201), the CPU 11 causes the in-vehicle communication unit 14 to transmit the frame that instructs the user interface device 7 to display the selection screen (FIG. 7) capable of receiving user operation instructing stop of the process, to the ECU controlling the user interface device 7 (step S203). As a result, the selection screen shown in FIG. 7 is displayed on the user interface device 7.

Upon receiving user operation to select the process to be stopped (YES in step S205), the CPU 11 causes the in-vehicle communication unit 14 to transmit a frame that instructs the ECU executing the selected process to stop the process (step S207). As a result, the selected process is stopped.

Effects of Second Embodiment

In the case where deficiency of the remaining battery level before completion of the update process is predicted due to execution of the update control process according to the present embodiment, the process selected by the user among the processes under operation is stopped. As a result, stoppage of the update process due to deficiency of the battery is avoided, and the update process is completely executed. Further, it is possible to prevent stoppage of the process unintended by the user.

Third Embodiment

In the program update system according to each of the first embodiment and the second embodiment, the process under operation other than the update process during execution of the update process is stopped to prevent deficiency of the necessary electric energy before completion of the update process. In other words, in the update control process according to each of these embodiments, the update process is performed in preference to the other processes. As another example of the update control process, the other processes may be performed in preference to the update process. In an update control process according to a third embodiment, the other processes are performed in preference to the update process.

The update of the control program may include a plurality of partial update processes performed at a series of timing. The plurality of partial update processes includes, for example, update independent in units of functions of the control program, and update independent in units of data. In this case, the update process can be independently performed for each partial update process in units of functions or data.

Accordingly, in the third embodiment, in the case where deficiency of the necessary electric energy of the battery before completion of the update process is predicted during execution of the update process, the partial update processes under operation out of the update processes under operation are interrupted.

In the third embodiment, the update control unit 111 may automatically interrupt the process determined based on the predetermined selection criterion such as priority among the plurality of partial update processes, as with the first embodiment. In this case, as with the first embodiment, the update control unit 111 previously stores the priority set for each of the partial update processes, and instructs the target ECU to interrupt the partial update process in order of lower priority. The flow of the update control process in this case is substantially the same as the flow in the flowchart of FIG. 6.

Alternatively, as with the second embodiment, the update control unit 111 displays, on the user interface device 7, the selection screen to receive the user operation about the process interruptible in response to an instruction by the user among the plurality of partial update processes, and receives selection of the process to be interrupted. Further, the update control unit 111 instructs the target ECU to interrupt the selected process among the plurality of partial update processes. The flow of the update control process in this case is substantially the same as the flow in the flowchart of FIG. 8.

Figure 9:
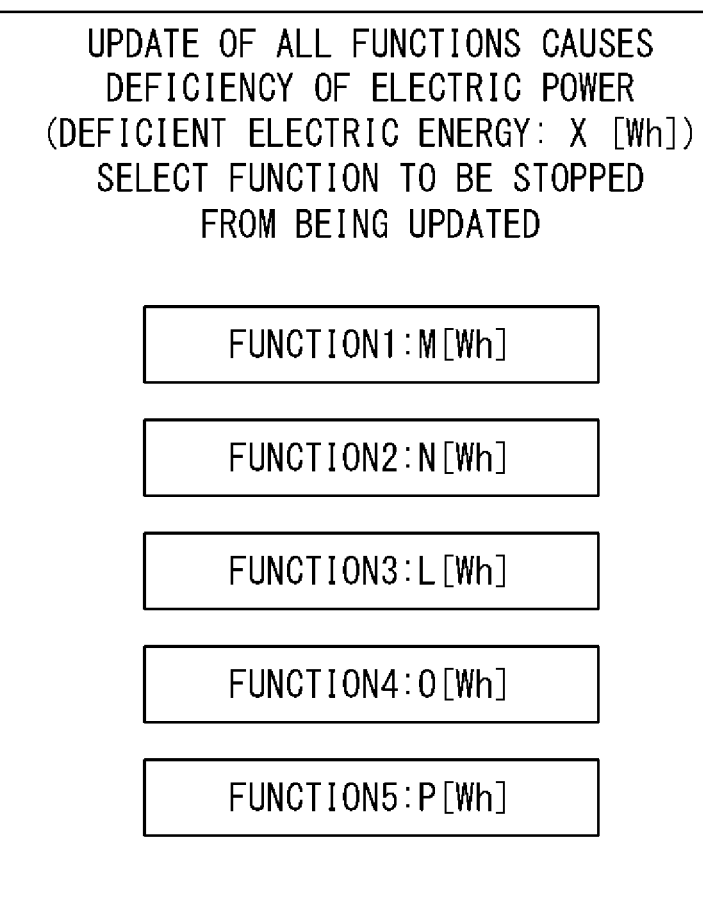
FIG. 9 is a diagram showing an example of the selection screen.

FIG. 9 is a diagram showing an example of the selection screen according to the third embodiment. As shown in FIG. 9, the selection screen according to the third embodiment includes display of the partial update processes interruptible in response to an instruction by the user out of the update process under processing, in addition to the power deficiency prediction notification, as with the selection screen according to the second embodiment of FIG. 7. In the example of FIG. 9, each of the partial update processes corresponds to each function, and user operation (for example, touch operation) to instruct interruption can be received for the update process of each of functions 1 to 5.

Note that, when the function to be interrupted from being updated is selected in the selection screen of FIG. 9, the selectable set of functions is defined as a set of functions not essentially requiring simultaneous update.

Preferably, the update control unit 111 displays the deficient electric energy X and electric energy consumptions M to P of the respective partial update processes on the selection screen. Each of the electric energy consumptions M to P of the respective partial update processes can be calculated by multiplying a time t (t=s/v) required for each of the partial update processes by a previously-stored power consumption p per unit time by the target ECU. The time t required for each of the partial update processes is obtained from a data size s of the update program required for each of the partial update processes obtained from the management server 5, and the data writing speed v by the target ECU.

Effects of Third Embodiment

In the case where deficiency of the remaining battery level before completion of the update process is predicted due to execution of the update control process according to the third embodiment, the update process is partially interrupted. This avoids stoppage of the update process caused by deficiency of the battery.

Further, in the program update system according to the third embodiment, in the case where deficiency of the remaining battery level before completion of the update process is predicted, the other process among the processes under operation is performed in preference to the update process. Accordingly, in a case where the user gives preference to the other process such as operation of the air conditioner and reproduction of the movie, the part of the update process processable by the remaining battery level is executed without stopping the other process, and the part of the update process not processable by the remaining battery level is interrupted. As a result, the convenience of the user is not impaired.

Fourth Embodiment

The first embodiment, the second embodiment, and the third embodiment may be combined. In the case where deficiency of the necessary electric energy of the battery before completion of the update process is predicted during execution of the update process, user operation to select which of the update process and the other process is given preference is received. In other words, in a case where the determination result of the determination unit 113 is the above-described third determination result (NO in step S105), the update control unit 111 displays, on the user interface device 7, a selection screen that displays a message of, for example, "give preference to update of control program?" and receives the user operation to select which of the update process and the other process is given preference, and receives selection. Further, the update control unit 111 may execute the update control process according to the first or second embodiment or the update control process according to the third embodiment based on the selection result.

As a result, stoppage of the update process due to deficiency of the battery is avoided, and stoppage of the process unintended by the user can be prevented.

Note that, in the above-described first to fourth embodiments, the update process of the control program is regarded as main process, and the other processes or a part of the update process is stopped or interrupted in order to prevent stoppage of the update process due to deficiency of the battery; however, the main process is not limited to the update process and may be the other process. In other words, in the case where there is the plurality of processes under operation and deficiency of the remaining battery level at completion of the main process that is one of the plurality of processes under operation is predicted, the processes other than the main process or a part of the main process may be stopped or interrupted automatically based on the predetermined selection criterion or based on user operation.

The disclosed features are achieved by one or more modules. For example, the features can be achieved by a circuit element and other hardware module, by a software module specifying process achieving the features, or by a combination of the hardware module and the software module.

A program as a combination of one or more software modules to cause a computer to execute the above-described operation can also be provided. Such a program can be recorded in a computer-readable recording medium such as a flexible disk, a CD-ROM (Compact Disk-Read Only Memory), a ROM, a RAM, and a memory card attached to a computer, and provided as a program product. Alternatively, the program can be provided by being recorded in a recording medium such as a hard disk incorporated in the computer. Furthermore, the program can be provided by download through a network.

Note that the program according to the present disclosure may call a necessary module from program modules provided as a part of the operating system (OS) of the computer, at a predetermined sequence at predetermined timing, to execute processing. In this case, the program itself does not include the above-described module, and the processing is executed in cooperation with the OS. Such a program not including the module may also be included in the program according to the present disclosure.

The program according to the present disclosure may be provided by being incorporated in a part of the other program. Also in this case, the program itself does not include a module included in the above-described other program, and the processing is executed in cooperation with the other program. Such a program incorporated in the other program may also be included in the program according to the present disclosure. The provided program product is installed in a program storage unit such as a hard disk and is then executed. Note that the program product includes a program itself and a recording medium storing the program.

The embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST

1 vehicle
2 wide-area communication network
4 in-vehicle network
5 management server
6 DL server
7 user interface device
10 gateway (control apparatus)
11 CPU
12 RAM
13 storage unit
14 in-vehicle communication unit
15 wireless communication unit
16 in-vehicle communication line
30 ECU (on-vehicle control device)
31 CPU
32 RAM
33 storage unit
34 communication unit
35 start-up unit
51 CPU
52 ROM
53 RAM
54 storage unit
55 communication unit
111 update control unit (control unit)
112 acquisition unit
113 determination unit
114 setting unit

The invention claimed is:

1. A control apparatus configured to communicate with a plurality of on-vehicle control devices through in-vehicle communication lines, the control apparatus comprising:
   an acquisition unit configured to acquire electric energy of a battery supplying electric power to the plurality of on-vehicle control devices; and
   a control unit configured to instruct, in a case where predicted electric energy of the battery at a time when a process by a target device that is one of the plurality of on-vehicle control devices is completed is lower than a first threshold, other on-vehicle control devices to stop respective processes by the other on-vehicle control devices executed in parallel with the process by the target device.

2. The control apparatus according to claim 1, wherein the process by the target device includes an update process of a control program during stoppage of a vehicle.

3. The control apparatus according to claim 1, wherein, in a case where a plurality of processes by the other on-vehicle control devices is executed in parallel, the control unit determines a process to be stopped among the plurality of processes based on priority set for each process.

4. The control apparatus according to claim 1, wherein, in a case where a plurality of processes by the other on-vehicle control devices is executed in parallel, the control unit determines a process to be stopped among the plurality of processes based on user operation to select the process to be stopped.

5. The control apparatus according to claim 1, wherein, in a case where a reduction speed of the battery is higher than a reference speed described below, the control unit instructs the other on-vehicle control devices to stop the respective processes, the reference speed being a speed at which the electric energy of the battery is reduced to electric energy corresponding to the first threshold before completion of the process by the target device.

6. The control apparatus according to claim 1, wherein the first threshold is a value obtained by imparting a predetermined margin to electric energy necessary for a process to interrupt the process by the target device.

7. The control apparatus according to claim 1, wherein, in a case where the electric energy of the battery is lower than a second threshold that is larger than the first threshold, the control unit determines whether the predicted electric energy is lower than the first threshold.

8. The control apparatus according to claim 7, wherein the second threshold is a value obtained by imparting a predetermined margin to electric energy necessary for completion of the process by the target device.

9. A control method for controlling a plurality of on-vehicle control devices by a control apparatus that communicates with the plurality of on-vehicle control devices through in-vehicle communication lines, the method comprising the steps of:

acquiring electric energy of a battery supplying electric power to the plurality of on-vehicle control devices; and instructing, in a case where predicted electric energy of the battery at a time when a process by a target device that is one of the plurality of on-vehicle control devices is completed is lower than a threshold, other on-vehicle control devices to stop respective processes by the other on-vehicle control devices executed in parallel with the process by the target device.

10. A non-transitory computer readable storage medium storing a computer program for causing a computer to function as a control apparatus configured to communicate with a plurality of on-vehicle control devices through in-vehicle communication lines, the computer program causing the computer to function as:

an acquisition unit configured to acquire electric energy of a battery supplying electric power to the plurality of on-vehicle control devices; and a control unit configured to instruct, in a case where predicted electric energy of the battery at a time when a process by a target device that is one of the plurality of on-vehicle control devices is completed is lower than a threshold, other on-vehicle control devices to stop respective processes by the other on-vehicle control devices executed in parallel with the process by the target device.

11. The control apparatus according to claim 1, wherein the control unit makes a determination of whether the predicted electric energy is lower than the first threshold after requesting the target device to perform the process, and instruction of the other on-vehicle control devices to stop the respective processes is based on the determination.

12. The control method according to claim 9, further comprising making a determination of whether the predicted electric energy is lower than the first threshold after requesting the target device to perform the process, and the instructing of the other on-vehicle control devices to stop the respective processes is based on the determination.

13. The non-transitory computer readable storage medium according to claim 10, wherein the control unit makes a determination of whether the predicted electric energy is lower than the first threshold after requesting the target device to perform the process, and instruction of the other on-vehicle control devices to stop the respective processes based on the determination.

* * * * *